Patented May 21, 1929.

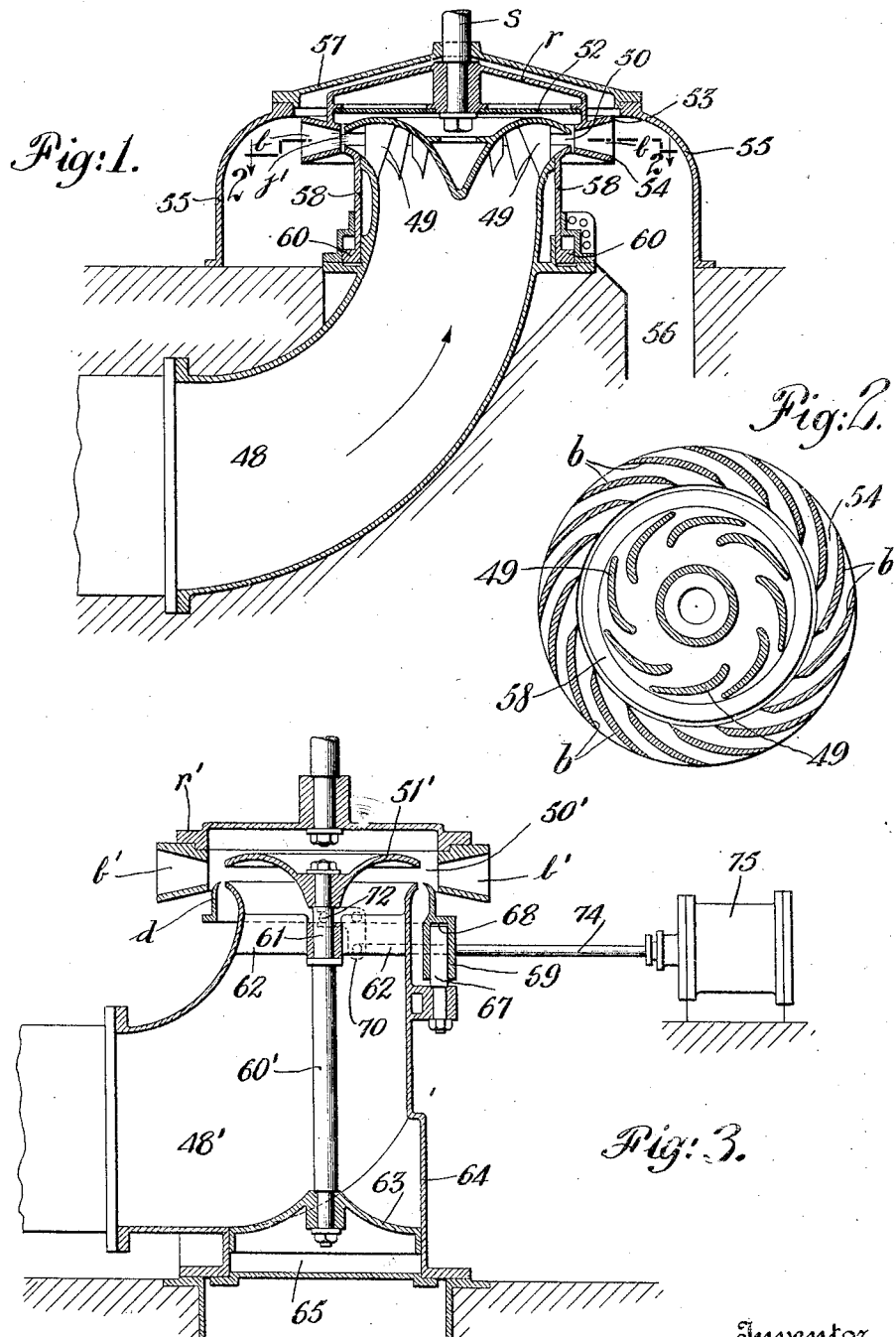

1,713,977

UNITED STATES PATENT OFFICE.

LEWIS FERRY MOODY, OF PHILADELPHIA, PENNSYLVANIA.

IMPULSE TURBINE.

Original application filed February 15, 1921, Serial No. 445,067. Divided and this application filed November 13, 1925. Serial No. 68,897.

This invention relates to impulse turbines and particularly to turbines having a high specific speed. The object of the invention is to provide an impulse turbine of the radial flow type in which the jet is continuous around the periphery of the runner so as to simultaneously act on all the buckets at once and in similar manner. Further objects of the invention in providing simple and inexpensive control means for the flow will appear from the following specification taken in connection with the accompanying drawings in which Fig. 1 is a vertical sectional view of one embodiment of the invention in an outward flow turbine.

Fig. 2 is a horizontal sectional view on line 2—2 of Fig. 1, and

Fig. 3 is a similar view of a modification.

In the turbine shown in Figs. 1 and 2 the flow enters through the intake 48 passes upward and outward through the inclined stay and guide vanes 49 and out of the nozzle 50 radially with an inclination or whirl due to the inclination of the guides 49 and the upper part 51 of the intake casing supported on vanes 49 is conically curved to smoothly guide the flow to the nozzle. The runner $r$ of this modification carries the outward flow buckets $b$ receiving the jet $j$ at their inner edges and discharging it at their outer edges. The runner $r$ is formed with an upper bucket ring 53 and a lower bucket ring 54 between which the blades or vanes $b$ extend and are preferably inclined to the radial as shown in Fig. 2 in the direction of rotation of the runner so that a relatively high speed of rotation is attained. The channel between the rings 53 and 54 expands outwardly to accommodate the spread of the flow against the bucket surfaces. The runner may also be provided with an auxiliary cover 52 over the intake. The discharge from the runner is collected in the casing 55 and carried to the outlet 56 connecting with the tailwater and the casing 55 is preferably provided with a top 57 forming an air tight enclosure within which the air pressure may be controlled by suitable connections. In this modification the lower edge of the nozzle 50 is adjustably carried by the cylinder 58 actuated by the fluid pressure operated piston 60 guided as shown while the guide vanes 49 are spaced an appreciable distance from the runner to form a transition space through which fluid flows as a continuous circular and solid jet to the runner.

In the modification shown in Fig. 3 the outward flow turbine has its intake 48' provided with an adjustable top 51' forming an adjustable annular nozzle 50'. The top 51' is supported by the rod 60' guided in the bearing 61 carried by the stays 62 from the walls of the intake casing, the lower end of the rod 60' is provided with the piston 63 working in the cylinder 64 and raised by fluid pressure in the space 65 beneath the piston. The jet is directed outward into the buckets $b'$ of the runner $r'$ and between the nozzle 50' and the buckets $b'$ is the deflector $d$ adjustably mounted on rods 67 extending through holes 68 in projections 69 of the deflector. The deflector is moved by the bell cranks 70 engaging the pins 72 at opposite sides of the deflector and the bell cranks in turn are moved by the piston rods 74 moved by pistons in the fluid pressure cylinders 75. This deflector $d$ operates to temporarily rise and divert a portion of the jet when there is a sudden decrease in the load, the head 51' gradually moving down to reduce the jet and the deflector $d$ after its first upward movement being lowered away from the jet.

The turbine of this invention provides a continuous radial jet and at the same time enables the direction of the jet to be given any desired inclination or whirl around the axis so as to increase the speed of the runner. The runner vane surfaces may also be given a flat curvature and large angle to the radial direction so that a relatively small movement of the jet stream will cause a large rotative movement of the runner and correspondingly high speed of rotation. At the same time the torque on the runner may be maintained high compared to impulse turbines of the tangential type for though the driving pressure on each bucket is small all of the buckets are continuously in operation. For very high specific speeds the flow into the runner may be directed more nearly in the radial than the tangential direction, that is, at angles of 45° or more with the tangent. The control means for the flow comprise simple axially movable parts and all the surfaces of the jet forming and control parts are circular and may be easily turned to accurate fit. The guiding surfaces at the nozzle edges are steeply inclined to give sufficient contraction so that the jet does not attain its maximum velocity until clear of the nozzle edges and diffusion of the jet is avoided. A passage continuous around the circumference is provided between the discharge ends of the guide vanes and the nozzle orifice to permit the separate streams discharged between the vanes to come together in a continuous stream; and sufficient contraction of the passage is provided in the direction of flow to insure the formation of a solid stream, the outermost filaments of the jet continuing to approach each other so as to overcome any tendency of the jet to spread out or diffuse. In the runner the flow spreads out against the surfaces of the buckets or vanes and is surounded by air on the other three sides. The tendency of the discharge to entrap air and carry it out with the water is utilized to produce a partial vacuum within the surrounding air-tight casing thus lowering the pressure against which the jet discharges and increasing the effective head on the turbine, by utilizing the fall from the runner to tailwater.

By directing the water into the runner in radial planes without axial components of flow, the water may be given a high radial component of motion and a reduced tangential component, in order to produce a comparatively low torque and correspondingly high speed of rotation of the runner, as has already been mentioned. This can be done without subjecting the runner to a high axial thrust, since all of the radial components of the impulse of the entering water are balanced. By avoiding axial components, complexities are avoided in the flow conditions and vane formation.

In both of the embodiments described, the water both enters and leaves in substantially radial planes, and no axial thrust is produced. In all of the embodiments described there is no side thrust upon the runner in a direction normal to the axis such as exists in impulse turbines of the so-called tangential type in which the water is admitted at only one point in the periphery.

This application is a division of my copending application Serial No. 445,067, filed February 15, 1921.

I claim:

1. In an impulse turbine the combination with a runner of the free jet or impulse type, of an inlet passage having a cylindrical orifice directing a continuous circular jet outward in a substantially radial plane against said runner, and means in said passage for imparting to said jet tangential components of flow with respect to the axis of said runner said means being spaced from said runner to form a transition space for effecting said continuous circular jet.

2. In an impulse turbine the combination with means for forming a radially outward progressing continuous circular jet containing tangential components of motion, of a runner having a circular series of buckets continuously acted upon by said jet and means for varying the thickness of said jet to control the speed of said runner.

3. In a hydraulic turbine a nozzle circularly symmetrical about an axis adapted to produce a free jet directed outward in a substantially radial plane and containing guiding means to give the jet both radial and tangential components of flow with respect to said axis, said guiding means being spaced from said runner to form a transition space, and the walls of said nozzle being formed to direct the outermost stream elements convergently toward each other to preserve a continuous circular body of fluid flowing from the nozzle through said transition space to the runner entrance.

4. In an impulse turbine in the combination of a runner having vanes inclined to the radial and in the direction of rotation of the runner, of a nozzle adapted to form a jet directed outward toward the runner periphery, and means for guiding said jet against said runner with tangential components and in a direction more nearly radial than tangential and being spaced from said runner to form a transition space.

5. In an impulse turbine the combination with a vertical shaft runner having a series of buckets suspended from a crown ring above, of jet forming means within and spaced from said ring of buckets to form a transition space and to direct the flow with tangential components into the inner entrance portions of said buckets.

6. In an impulse turbine the combination with a vertical shaft runner having a series of buckets suspended from a crown ring above, of jet forming means within and spaced from said ring of buckets to form a transition space and to direct the flow with tangential components into the inner entrance portions of said buckets, the flow being discharged outwardly from the outer portions of said buckets.

7. In an impulse turbine the combination with a vertical shaft runner having a series of buckets suspended from a crown ring above, of jet forming means within and spaced from said ring of buckets to form a transition space and to direct the flow with tangential components into the inner entrance portions of said buckets, and means for regulating the size of said jet.

8. In an impulse turbine the combination with a vertical shaft runner having a series of buckets carried by a crown ring, of jet forming means within and spaced from said ring of buckets to form a transition space and to direct the flow with tangential components into the inner entrance portions of said buckets, said buckets having vanes inclined to the radial in the direction of rotation of the runner.

9. In an impulse turbine the combination with a vertical shaft runner having a series of buckets suspended from a crown ring above, of jet forming means within and spaced from said ring of buckets to form a transition space and to direct the flow with tangential components into the inner entrance portions of said buckets, and enclosing means adapted to permit said runner to operate in air having a pressure less than atmospheric.

10. In an impulse turbine the combination with a vertical shaft runner having a series of buckets carried by a crown ring, of jet forming means within and spaced from said ring of buckets to form a transition space and thereby direct an annular flow with tangential components into the inner entrance portions of said buckets, said buckets having vanes inclined everywhere to the radial in the direction of rotation of the runner.

LEWIS FERRY MOODY.